(12) United States Patent
Suenaga

(10) Patent No.: US 9,590,750 B2
(45) Date of Patent: Mar. 7, 2017

(54) FADING SIMULATOR AND METHOD OF PRODUCING FADING SIGNAL

(71) Applicant: Akihiko Suenaga, Atsugi (JP)

(72) Inventor: Akihiko Suenaga, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 15/181,768

(22) Filed: Jun. 14, 2016

(65) Prior Publication Data

US 2017/0019195 A1    Jan. 19, 2017

(30) Foreign Application Priority Data

Jul. 17, 2015  (JP) ................. 2015-142745

(51) Int. Cl.
*H04W 24/06*  (2009.01)
*H04B 17/391*  (2015.01)
*H04B 17/309*  (2015.01)

(52) U.S. Cl.
CPC ....... *H04B 17/3911* (2015.01); *H04B 17/309* (2015.01)

(58) Field of Classification Search
None
See application file for complete search history.

(56) References Cited

U.S. PATENT DOCUMENTS

| 2004/0167758 A1* | 8/2004 | Takiishi | H04B 17/391 703/2 |
| 2007/0091814 A1* | 4/2007 | Leung | H04L 1/243 370/252 |
| 2007/0260443 A1* | 11/2007 | Bobok | G06F 17/5022 703/17 |
| 2013/0006601 A1* | 1/2013 | Mlinarsky | H04B 17/0087 703/23 |
| 2013/0260694 A1* | 10/2013 | Suenaga | H04W 24/06 455/67.14 |
| 2016/0286418 A1* | 9/2016 | Suenaga | H04W 24/06 |

FOREIGN PATENT DOCUMENTS

JP        08-265187        10/1996

* cited by examiner

*Primary Examiner* — David Bilodeau
(74) *Attorney, Agent, or Firm* — Greer Burns & Crain Ltd.

(57) ABSTRACT

According to one embodiment, a fading simulator which conducts a fading test on a mobile communications terminal configured to receive radio signals containing respective baseband signals, includes reception modules which receive the radio signals, convert frequencies of the radio signals, and extract the baseband signals from the radio signals, respectively, reproduction processing modules which perform reproduction processing on the baseband signals extracted by the reception modules, respectively, to produce new baseband signals, a fading arithmetic module which perform fading processing on the new baseband signals produced by the reproduction processing modules individually to produce fading signals, and transmission modules which convert the fading signals produced by the fading arithmetic module into radio signals, respectively, and output the radio signals as test signals to the mobile communications terminal.

8 Claims, 1 Drawing Sheet

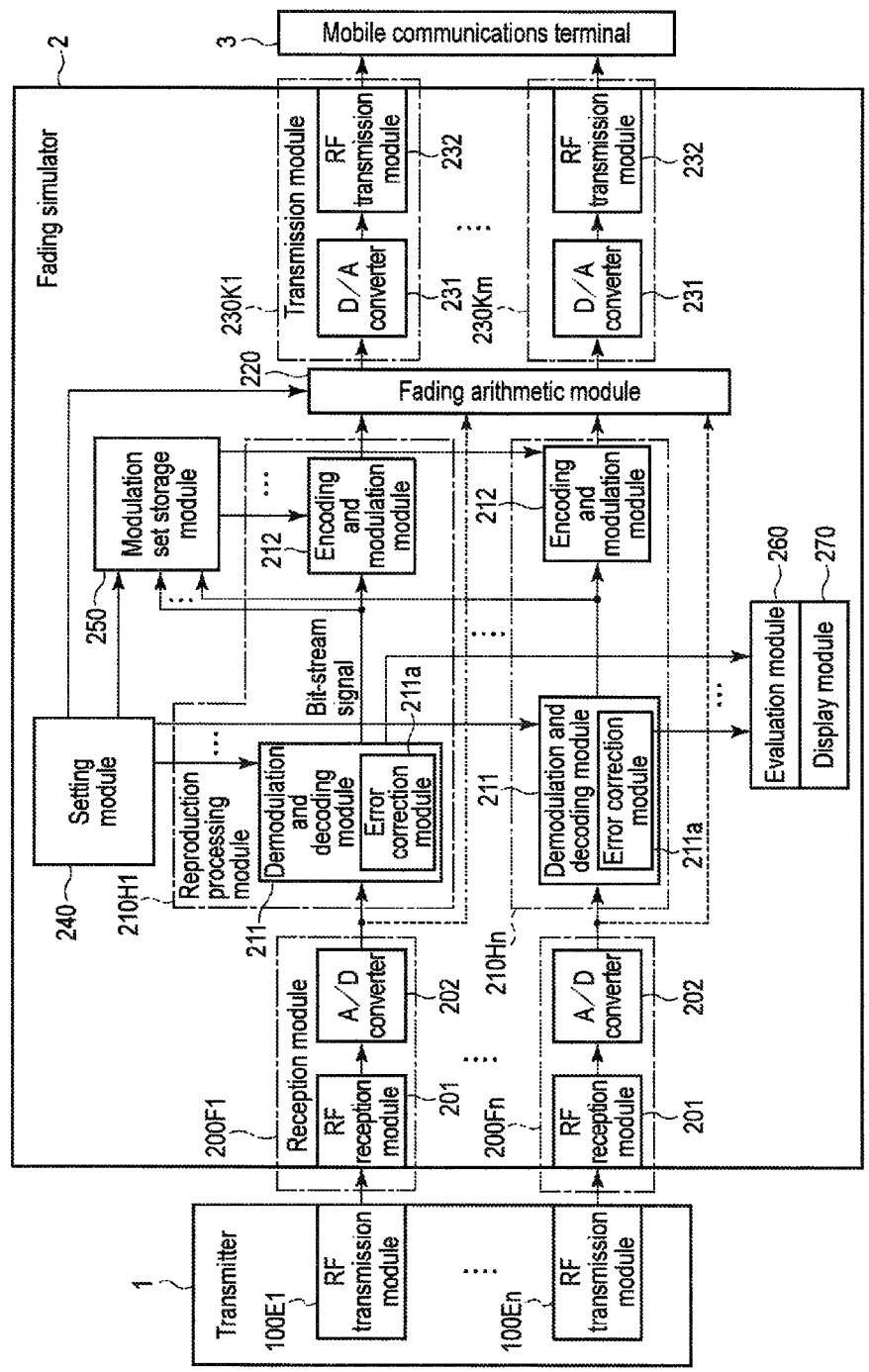

006
FADING SIMULATOR AND METHOD OF PRODUCING FADING SIGNAL

CROSS-REFERENCE TO RELATED APPLICATIONS

This application is based upon and claims the benefit of priority from prior Japanese Patent Application No. 2015-142745, filed Jul. 17, 2015, the entire contents of which are incorporated herein by reference.

BACKGROUND OF THE INVENTION

1. Field of the Invention

Embodiments described herein relate generally to a fading simulator and a method of producing a fading signal.

2. Description of the Related Art

Fading occurs when a mobile communications terminal receives radio waves from a base station while moving in a propagation path in which the amplitude and phase of radio waves vary randomly. Therefore, in order to evaluate the communication performance of the mobile communications terminal, a device which simulates a radio propagation environment and is referred to as a fading simulator is used along with a pseudo base-station apparatus which simulates the base station (see JP 8-265187 A).

In recent years, mobile communications terminals have been used to more frequently download data through the Internet. Thus, as systems for increasing the amount of data to be downloaded, a multiple input multiple output (MIMO) system, a multicarrier system (for example, carrier aggregation), etc., have been proposed. Mobile communications terminals applied in the MIMO system is each provided with a multi-antenna, and receive a plurality of radio-frequency (RF) signals.

In general, in the case where an ordinary test related to a reception characteristic, etc., is conducted on a multi-antenna mobile communications terminal, using a pseudo base-station apparatus, a transmitter is prepared. The transmitter outputs as test signals, RF signals which are modulated in different basebands, and the number of which corresponds to the number of the antennas. The test signals are transmitted from the transmitter to the mobile communications terminal to conduct the test thereon.

Also, in a fading test on the multi-antenna mobile communications terminal, fading processing is performed which causes fading to occur in a baseband signal. There is a case where the baseband signal subjected to the fading processing is converted into an RF signal, and the RF signal is applied as a test signal for fading simulation. In this case, a signal generator generates a plurality of different baseband signals, not RF signals.

Incidentally, in the above ordinary test, a plurality of RF signals are output as test signals. Thus, there is a demand for conduction of a test related to fading, using the RF signals. To be more specific, it is demanded that from a transmitter which is applied to the above ordinary test to generate RF signals, the RF signals are received, and fading simulation is performed by a fading simulator which gives fading to baseband signals obtained from the received RF signals.

In this case, the above transmitter produces a digital baseband signal, converts it into an analog baseband signal, also converts the analog baseband signal into an RF signal, and outputs the RF signal as a test signal. The fading simulator receives via an RF reception module the RF signal output from the transmitter, and converts the frequency of the received RF signal to extract a baseband signal. Furthermore, the fading simulator performs predetermined fading processing on the extracted baseband signal to produce a fading signal. Then, the fading simulator converts the frequency of the fading signal into an RF band frequency to change the fading signal back to an RF signal, and outputs the RF signal as a test signal to the mobile communications terminal.

However, in a time period in which after the digital baseband signal is produced by the transmitter, it is received by the RF reception module of the fading simulator, there is a possibility that a baseband signal in which fading is to be made to occur will be influenced by the conversion at the RF band frequency, etc., and the quality of the baseband signal will thus be changed. For example, in the case where noise enters the RF reception module of the fading simulator from the outside thereof, if the performance (for example, a noise removal performance) of the RF reception module is low, the quality of the baseband signal output from the RF reception module is lowered, as a result of which a fading signal also having a low quality is produced.

As a countermeasure against the above, for example, it is conceivable that the performance of the RF reception module is improved. However, in this countermeasure, a single RF reception module is made to have a larger structure. Also, in the case where a fading test is conducted on a multi-antenna mobile communications terminal, it is necessary to provide a plurality of RF reception modules, and a fading simulator is made to have a further larger size.

BRIEF SUMMARY OF THE INVENTION

According to the first aspect of the present invention, there is provided a fading simulator (2) which conducts a fading test on a mobile communications terminal (3) configured to receive a plurality of radio signals containing respective baseband signals, comprising:

a plurality of reception modules (200F) which receive the radio signals, convert frequencies of the radio signals, and extract the baseband signals from the radio signals, respectively;

a plurality of reproduction processing modules (210H) which perform reproduction processing on the baseband signals extracted by the reception modules (200F), respectively, to produce new baseband signals;

a fading arithmetic module (220) which perform fading processing on the new baseband signals produced by the reproduction processing modules (210H) individually to produce a plurality of fading signals; and a plurality of transmission modules (230K) which convert the fading signals produced by the fading arithmetic module (220) into radio signals, respectively, and output the radio signals as test signals to the mobile communications terminal (3).

According to the second aspect of the present invention, in the fading simulator according to the first aspect, each of the reproduction processing modules (210H) comprises:

a demodulation and decoding module (211) which converts the baseband signal extracted from a reception module (200F) into a bit-stream signal by performing demodulation and decoding on the extracted baseband signal, performs error detection on the bit-stream signal, corrects an error if the bit-stream signal has the error, and outputs the bit-stream signal; and an encoding and modulation module (212) which converts the bit-stream signal output from the demodulation and decoding module (211) into the new baseband signal.

According to the third aspect of the present invention, the fading simulator according to the first aspect further comprises an evaluation module (260) which evaluates the quality of the radio signals received by the reception modules (200F) based on the baseband signals extracted by the reception modules (200F), and outputs results of evaluation of the quality of the radio signals.

According to the fourth aspect of the present invention, the fading simulator according to the second aspect further comprising an evaluation module (260) which evaluates the quality of the radio signals received by the reception modules (200F) based on the bit-stream signals extracted by the demodulation and decoding modules (211), and outputs results of evaluation of the quality of the radio signals.

According to the fifth aspect of the present invention, there is provided a fading-signal producing method for conducting a fading test on a mobile communications terminal configured to receive a plurality of radio signals containing a plurality of baseband signals, respectively, the method comprising:

a reception step of receiving the radio signals, converting frequencies of the radio signals, and extracting the baseband signals from the radio signals, individually;

a reproduction processing step of individually performing reproduction processing on the baseband signals extracted in the reception step to produce a plurality of new baseband signals;

a fading arithmetic step of individually performing fading processing on the new baseband signals produced in the reproduction processing step to produce a plurality of fading signals; and a transmission step of individually converting the fading signals produced in the fading arithmetic step into radio signals, and outputting the radio signals as test signals to the mobile communications terminal.

According to the sixth aspect of the present invention, in the fading-signal producing method according to the fifth aspect, the reproduction processing step comprises:

a first conversion step of converting the baseband signals extracted in the reception step into bit-stream signals by performing demodulation and decoding on the extracted baseband signals;

an output step of performing error detection on the bit-stream signals, and outputting the bit-stream signals after correcting an error, if any of the bit-stream signals has the error; and a second conversion step of converting the bit steam signals output in the output step into the new baseband signals.

According to the seventh aspect of the present invention, the fading-signal producing method according to the fifth aspect further comprises an evaluation step of evaluating the quality of the radio signals received in the reception step, based on the baseband signals extracted in the reception step, and outputting results of evaluation of the quality of the radio signals.

According to the eighth aspect of the present invention, the fading-signal producing method according to the sixth aspect further comprises an evaluation step of evaluating the quality of the radio signals received in the reception step, based on the bit-stream signals obtained by conversion in the first conversion step, and outputting results of evaluation of the quality of the radio signals.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

The single FIGURE is an exemplary block diagram showing a configuration of a fading simulator according to an embodiment.

DETAILED DESCRIPTION OF THE INVENTION

Various embodiments will be described hereinafter with reference to the accompanying drawing.

An embodiment described herein relates to a technique concerning fading processing for simulating fading which occurs because of a spatial propagation between a mobile communications terminal and a base station. It relates to, especially, a technique in which after receiving a radio signal (sometimes referred to as a radio-frequency [RF] signal), a baseband signal is extracted, subjected to fading processing, and converted back to an RF signal, and the RF signal is sent to the mobile communications terminal to conduct a test thereon.

The embodiment will be explained with reference to FIG. 1. A mobile-communications-terminal test system according to the embodiment comprises a transmitter 1, a fading simulator 2 and a mobile communications terminal 3. In this system, a fading test is conducted on the mobile communications terminal 3. It should be noted that as the mobile communications terminal 3, for example, a multi-antenna mobile communications terminal is used.

The transmitter 1 includes a plurality of RF transmission modules 100E1 to 100En. The fading simulator 2 includes a plurality of reception modules 200F1 to 200Fn, a plurality of reproduction processing modules 210H1 to 210Hn, a fading arithmetic module 220, a plurality of transmission modules 230K1 to 230Km, a setting module 240, a modulation set storage module 250, an evaluation module 260 and a display module 270.

The reception modules 200F1 to 200Fn each include an RF reception module 201 and an A/D converter 202, and perform predetermined radio reception processing to be described later. The reproduction processing modules 210H1 to 210Hn each include a demodulation and decoding module 211 and an encoding and modulation module 212, and perform a predetermined reproduction processing (processing for improving a signal quality) to be described later. The transmission modules 230K1 to 230Km each include a D/A converter 231 and an RF transmission module 232, and perform a predetermined radio transmission processing to be described later.

It should be noted that the RF transmission modules 100E1 to 100En have the same function; the reception modules 200F1 to 200Fn have the same function; the reproduction processing modules 210H1 to 210Hn have the same function, and the transmission modules 230K1 to 230Km have the same function.

In the following explanations, where a plurality of elements have the same function, there is a case where the elements will be explained by referring to only one of them. Also, there is case where the RF transmission modules 100E1 to 100En will be generically referred to as RF transmission modules 100E; the reception modules 200F1 to 200Fn will be generically referred to as reception modules 200F; the reproduction processing modules 210H1 to 210Hn will be generically referred to as reproduction processing modules 210H; and the transmission modules 230K1 to 230Km will be generically referred to as transmission modules 230K.

It should be noted that n reception modules 200F are associated with n RF transmission modules 100E (100E1 to 100En) of the transmitter 1, respectively. m transmission modules 230K (230K1 to 230Km) of the fading simulator 2 are associated with m antennas of the mobile communications terminal 3. Where n=m, the above modules are associated with the antennas, respectively. However, the number of outputs of the fading arithmetic module 220 can be set to m, not n.

In the transmitter 1, an RF transmission module 100E adds an error correction code (data such as a parity code) to a baseband signal which is original data, to thereby produce a digital baseband signal. Then, the RF transmission module 100E performs digital signal processing on the baseband signal including the error correction code added thereto, the digital signal processing including processing for producing a transmission frame (for example, an OFDM frame) having a format conforming to a predetermined communications system and digital signal processing including encoding, etc. The RF transmission module 100E converts a signal subjected to the digital signal processing into an analog signal, also converts the frequency thereof, incorporates a signal wave which is a baseband signal into a carrier wave, and outputs the carrier wave as n RF signals (radio signals) having an RF band. It should be noted that as error correction codes, a Reed-Solomon code (RS code), a convolutional code, a turbo code, etc., are present in addition to the above parity code (redundancy for performing error detection and correction).

In the fading simulator 2, the RF reception module 201 of a reception module 200F converts the frequency of a received RF signal, removes a carrier wave component from the RF signal to extract a signal wave component, i.e., an analog baseband signal, and outputs the analog baseband signal. In this case, as the RF reception module 201, an RF reception module having a simple structure which may deteriorate the quality of a signal to some extent is adopted. It should be noted that the baseband signal includes an error correction code.

The A/D converter 202 of the reception module 200F converts the analog baseband signal output from the RF reception module 201 into a digital baseband signal, and outputs the digital baseband signal.

It may be set that after the RF reception module 201 of the reception module 200F converts the frequency of the received RF signal, and outputs it, the signal output from the RF reception module 201 is converted into a digital signal by the A/D converter of the reception module 200F, and the RF reception module 201 extracts from the digital signal a digital baseband signal.

The demodulation and decoding module 211 of each of the reproduction processing modules 210H includes a demodulation module (not shown), a decoding module (not shown) and an error correction module 211a. The demodulation module performs demodulation processing (such as QPSK demodulation or OFDM demodulation) on the digital baseband signal output from the A/D converter 202.

The decoding module performs decoding processing conforming to the predetermined communications system on the digital baseband signal subjected to the demodulation processing to obtain a bit-stream signal provided as a bit string, and the error correction module 211a performs error detection on the bit-stream signal. If the bit-stream signal has no error, the decoding module outputs the bit-stream signal as it is, and if the bit-stream signal has an error, the error correction module 211a corrects the error, and the decoding module then outputs the corrected bit-stream signal.

In the case where a parity bit is added as an error correction code to an RF signal sent from an associated RF transmission module 100E in the transmitter 1, the error correction module 211a extracts the parity bit to perform error detection, and corrects a detected bit error with an algorithm for error correction.

The encoding and modulation module 212 of an associated reproduction processing module 210H performs encoding processing and modulation processing (such as QPSK modulation or OFDM modulation) on a bit-stream signal output from the demodulation and decoding module 211 of the above reproduction processing module 210H, and produces a new baseband signal from the bit-stream signal.

As described above, by the demodulation and decoding module 211, a baseband signal is converted into a bit-stream signal. The bit-stream signal is subjected to error correction by the error correction module 211a, and is thus reproduced as a bit-stream signal having no error. The bit-stream signal is converted into a new baseband signal by the encoding and modulation module 212, and input to the fading arithmetic module 220, which will be described later. The quality of the new baseband signal is equivalent (ideal) to that of a baseband signal in an RF signal output from the RF transmission module 100E in the transmitter 1.

The setting module 240 receives data indicating the setting of conditions of demodulation and decoding which conform to a communications system and setting of conditions of encoding and modulation (such as an encoding algorithm and an encoding ratio of an RS code, a convolutional code, a turbo code or the like), which are given by a user. Then, the setting module 240 outputs the data indicating the setting to the demodulation and decoding module 211, and further outputs it to the encoding and modulation module 212 through the modulation set storage module 250. Also, the setting module 240 receives data indicating switching setting of fading processing which is made by the user, and outputs it to the fading arithmetic module 220.

The modulation set storage module 250, for example, stores in advance data indicating conditions of modulation conforming to the communications system, which is given by the user through the setting module 240. Then, the modulation set storage module 250 selects condition of modulation from the data stored in the modulation set storage module 250 in advance, the condition of modulation being associated with bit streams which are output from the demodulation and decoding modules 211, respectively, and outputs the selected to the encoding and modulation modules 212. Also, the user can select and set any of the above conditions using the setting module 240.

It should be noted that the user may directly set parameters of encoding and modulation using the setting module 240. For example, in the case where a communication system (LTE, ISDB or the like) to be selected varies from one test to another, it is necessary to set parameters of encoding and modulation which are associated with parameters of predetermined demodulation and decoding in a selected communication system. In this case, using the setting module 240, the user can set associated modulation parameters and also predetermined encoding and modulation processing.

Furthermore parameters included in bit streams output from the demodulation and decoding modules 211 may be obtained and applied as the parameters of the encoding and modulation.

The fading arithmetic module 220 performs fading processing on n digital baseband signals output from the encoding and modulation modules 212, respectively, to give a fading effect to the digital baseband signals, and outputs fading signals given the fading effect. The fading arithmetic module 220, for example, is formed of n fading arithmetic circuits; however, its structure is not limited to this.

For example, in the case of applying the MIMO system, as indicated in formula (1) below, in a calculation to be made, weights indicated by parameters H11 to Hmn representing a transmission state of a propagation path are assigned to baseband signals BX1 to BXn to be input to the fading arithmetic module 220. Thereby, it is possible to produce m fading signals FX1 to FXm having basebands and subjected to the fading processing. The condition and effect of the calculation can be set by the setting module 240. The following formula (1) is an example of the case of applying the MIMO system.

$$\begin{bmatrix} FX1 \\ FX2 \\ \vdots \\ FXm \end{bmatrix} = \begin{bmatrix} H11 & \ldots & H1n \\ H21 & \ldots & H2n \\ \vdots & & \vdots \\ Hm1 & \ldots & Hmn \end{bmatrix} \begin{bmatrix} BX1 \\ BX2 \\ \vdots \\ BXn \end{bmatrix} \quad (1)$$

It should be noted that, as explained above, the fading arithmetic module 220 performs predetermined fading processing on baseband signals output from the encoding and modulation modules 212. However, the fading arithmetic module 220 can also perform the fading processing upon reception of digital baseband signals from the A/D converters, in accordance with a user's setting indicated using the setting module 240 (as indicated as paths by dotted arrows in FIG. 1).

The D/A converters 231 of transmission modules 230K convert digital fading signals transmitted from the fading arithmetic module 220 into analog fading signals.

The RF transmission modules 232 of the transmission modules 230K convert the frequencies of analog fading signals output from the D/A converters 231 into RF bands (radio-frequency bands)), and then cause the RF bands to be reflected in carrier waves, thereby producing RF signals (radio signals). Then, the RF transmission modules 232 output the produced RF signals as test signals to the mobile communications terminal 3.

The evaluation module 260 has a measuring function for evaluating signals received by the RF reception modules 201 on the basis of bit-stream signals and error detection data output from the demodulation and decoding modules 211. When the evaluation module 260 receives the error detection data from the demodulation and decoding modules 211, it calculates an error rate, and outputs the result of this calculation to the display module 270 to cause it to display the result. It should be noted that without calculating the error rate, the display module 270 may be caused to indicate whether an error is present or absent.

For example, the evaluation module 260 performs an error vector magnitude (EVM) measurement, an SN ratio measurement, etc. The EVM measurement is measurement for reading the quality of a received RF signal or the performance. By performing the EVM measurement, it is possible to find a cause of a disturbance or distortion occurring in the received RF signal, and deal with it. The results of the EVM measurement and the SN ratio measurement are output to the display module 270, and displayed thereby. In such a manner, it is possible to confirm a reception state of the fading simulator 2 by performing the EVM measurement, the SN ratio measurement, etc.

As explained above, in the fading simulator 2 according to the embodiment, each of the reproduction processing modules 210H is located in the subsequent stage with respect to an associated reception module 200F, which may be deteriorated in quality. Each reproduction processing module 210H performs reproduction processing on a digital baseband signal output from the reception module 200F to produce a new digital baseband signal. To be more specific, even if the baseband signal output from the reception module 200F has a bit error which is caused by, for example, noise, a new digital baseband signal is produced without being deteriorated in quality since error correction, etc., are performed by an associated reproduction processing module 210H. By virtue of this feature, a fading effect can be given to the baseband signal which is not deteriorated in quality. It is therefore possible to reduce an adverse effect of the characteristics in the RF band, and thus output a proper test signal.

When the evaluation module 260 receives error detection data, it calculates an error rate, and the result of this calculation or the presence or absence of an error is displayed by the display module 270, thus enabling the quality of an input baseband signal to be visibly recognized. Therefore, the user can grasp the quality of the signal in real time.

In the fading simulator according to the embodiment, the reproduction processing modules are located in the subsequent stage with respect to the reception modules, respectively, which may be deteriorated in quality.

The reproduction processing modules perform reproduction processing on digital baseband signals output from the reception modules to produce new digital baseband signals, respectively. Therefore, for example, even if a baseband signal output from a reception module has a bit error which is caused by noise, a new baseband signal can be produced without being deteriorated since error correction, etc., are carried out by the reproduction processing, and a fading effect can also be given to the new baseband signal. Therefore, it is possible to reduce an adverse effect of the characteristics in the RF band, and thus output a proper test signal.

The various modules of the systems described herein can be implemented as software applications, hardware and/or software modules, or components on one or more computers, such as servers. While the various modules are illustrated separately, they may share some or all of the same underlying logic or code.

Various inventions can be made by appropriately combining a plurality of structural elements disclosed with respect to the above embodiment. For example, some of all the structural elements disclosed with respect to the embodiment may be deleted. Furthermore, structural elements of different embodiments may be combined as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fading simulator which conducts a fading test on a mobile communications terminal configured to receive a plurality of radio signals containing respective baseband signals, comprising:

a plurality of reception modules which receive the radio signals, convert frequencies of the radio signals, and extract the baseband signals from the radio signals, respectively;

a plurality of reproduction processing modules which perform reproduction processing on the baseband signals extracted by the reception modules, respectively, to produce new baseband signals;

a fading arithmetic module which perform fading processing on the new baseband signals produced by the reproduction processing modules individually to produce a plurality of fading signals; and a plurality of transmission modules which convert the fading signals produced by the fading arithmetic module into radio signals, respectively, and output the radio signals as test signals to the mobile communications terminal.

2. The fading simulator of claim 1, wherein each of the reproduction processing modules comprises:

a demodulation and decoding module which converts the baseband signal extracted from a reception module into a bit-stream signal by performing demodulation and decoding on the extracted baseband signal, performs error detection on the bit-stream signal, corrects an error if the bit-stream signal has the error, and outputs the bit-stream signal; and an encoding and modulation module which converts the bit-stream signal output from the demodulation and decoding module into the new baseband signal.

3. The fading simulator of claim 2, further comprising an evaluation module which evaluates quality of the radio signals received by the reception modules based on the bit-stream signals extracted by the demodulation and decoding modules, and outputs results of evaluation of the quality of the radio signals.

4. The fading simulator of claim 1, further comprising an evaluation module which evaluates quality of the radio signals received by the reception modules based on the baseband signals extracted by the reception modules, and outputs results of evaluation of the quality of the radio signals.

5. A fading-signal producing method for conducting a fading test on a mobile communications terminal configured to receive a plurality of radio signals containing a plurality of baseband signals, respectively, the method comprising:

a reception step of receiving the radio signals, converting frequencies of the radio signals, and extracting the baseband signals from the radio signals, individually;

a reproduction processing step of individually performing reproduction processing on the baseband signals extracted in the reception step to produce a plurality of new baseband signals;

a fading arithmetic step of individually performing fading processing on the new baseband signals produced in the reproduction processing step to produce a plurality of fading signals; and a transmission step of individually converting the fading signals produced in the fading arithmetic step into radio signals, and outputting the radio signals as test signals to the mobile communications terminal.

6. The fading-signal producing method of claim 5, wherein the reproduction processing step comprises:

a first conversion step of converting the baseband signals extracted in the reception step into bit-stream signals by performing demodulation and decoding on the extracted baseband signals;

an output step of performing error detection on the bit-stream signals, and outputting the bit-stream signals after correcting an error, if any of the bit-stream signals has the error; and a second conversion step of converting the bit steam signals output in the output step into the new baseband signals.

7. The fading-signal producing method of claim 6, further comprising an evaluation step of evaluating quality of the radio signals received in the reception step, based on the bit-stream signals obtained by conversion in the first conversion step, and outputting results of evaluation of the quality of the radio signals.

8. The fading-signal producing method of claim 5, further comprising an evaluation step of evaluating quality of the radio signals received in the reception step, based on the baseband signals extracted in the reception step, and outputting results of evaluation of the quality of the radio signals.

* * * * *